(12) United States Patent
Pao

(10) Patent No.: US 6,302,802 B1
(45) Date of Patent: Oct. 16, 2001

(54) METHODS AND APPARATUS FOR A PORTABLE GOLF TRAINING SYSTEM WITH AN OPTICAL SENSOR NET

(75) Inventor: Yi-Ching Pao, Los Gatos, CA (US)

(73) Assignee: Focaltron Corporation, Santa Clara, CA (US)

( * ) Notice: Subject to any disclaimer, the term of this patent is extended or adjusted under 35 U.S.C. 154(b) by 0 days.

(21) Appl. No.: 09/344,194

(22) Filed: Jun. 24, 1999

(51) Int. Cl.$^7$ .................................................. A63B 69/36
(52) U.S. Cl. .................. 473/156; 473/152; 473/155; 473/198; 473/199
(58) Field of Search .................................. 473/150, 152, 473/155, 156, 190, 192, 197, 198, 199, 219, 221, 222; 250/221, 222; 356/28

(56) References Cited

U.S. PATENT DOCUMENTS

| | | | |
|---|---|---|---|
| 3,727,069 | 4/1973 | Crittenden, Jr. et al. | 250/222 R |
| 3,759,528 | 9/1973 | Christophers et al. | 273/176 FA |
| 4,136,387 | 1/1979 | Sullivan et al. | 364/410 |
| 4,150,825 | 4/1979 | Wilson | 273/185 B |
| 4,343,469 | 8/1982 | Kunita et al. | 273/185 A |
| 4,437,672 | 3/1984 | Armantrout et al. | 273/185 B |
| 4,542,906 | 9/1985 | Takase et al. | 273/185 R |
| 4,563,005 | 1/1986 | Hand et al. | 273/26 R |
| 4,652,121 | 3/1987 | Ito et al. | 356/28 |
| 4,770,527 | 9/1988 | Park | 356/28 |
| 4,949,972 | 8/1990 | Goodwin et al. | 273/371 |
| 5,024,441 | 6/1991 | Rousseau | 273/176 R |
| 5,230,505 | 7/1993 | Paquet et al. | 273/26 A |
| 5,277,426 | 1/1994 | Gerpheide et al. | 273/185 B |
| 5,333,874 | 8/1994 | Arnold et al. | 273/185 B |
| 5,342,054 | 8/1994 | Chang et al. | 273/186.1 |
| 5,390,927 | 2/1995 | Angelos | 273/185 A |
| 5,401,026 | 3/1995 | Eccher et al. | 273/184 R |
| 5,479,008 | 12/1995 | Nishiyama et al. | 250/222.1 |
| 5,481,355 | 1/1996 | Iijima et al. | 356/28 |
| 5,568,250 | 10/1996 | Nishiyama et al. | 356/28 |
| 5,577,733 | * 11/1996 | Downing | 273/348 |
| 5,602,638 | 2/1997 | Boulware | 356/28 |
| 5,626,526 | 5/1997 | Pao et al. | 473/156 |
| 5,988,645 | * 11/1999 | Downing | 273/348 |

* cited by examiner

*Primary Examiner*—Jessica J. Harrison
(74) *Attorney, Agent, or Firm*—Wilson Sonsini Goodrich & Rosati

(57) ABSTRACT

An optical sensor net system for measuring the relational dynamic information of a spheroidal projectile. A support frame for the system may include light emitters that generate divergent non-parallel rays of light. The non-parallel rays of light emitted may be directed to and received by a plurality of light detectors substantially arranged within a single plane. The intersecting non-parallel rays of light may form an asymmetrical optical sensor net that may also capture both golf ball and golf club information as they pass through. The light detectors that receive the rays of light may be spaced apart at preselected locations and distances less than the diameter of a spheroidal object such as a golf ball. A data processor or computer may be connected to the sensor net to detect relational spatial information for the golf ball and the golf club, and to determine instantaneous dynamic information for either including ball velocity or club speed based at least in part on the locations of the rays of light which are blocked off, and the measured time in which the rays of light emitted to the light detectors are interrupted and monitored by clock instrumentation. The optical sensor net and support frame may be tilted at preselected angles to capture relatively more information for a wide range of golf shots providing enhanced resolution of images depicting the golf ball and/or golf club.

11 Claims, 10 Drawing Sheets

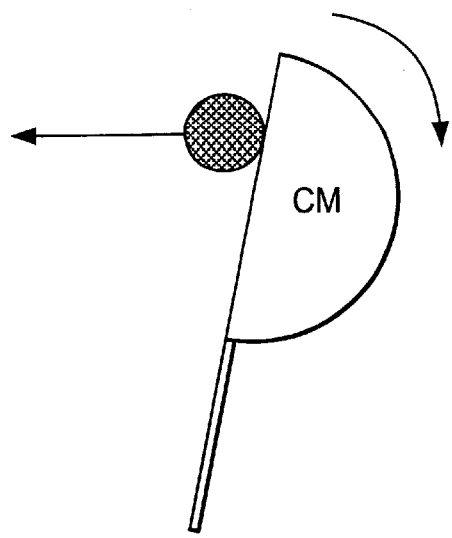 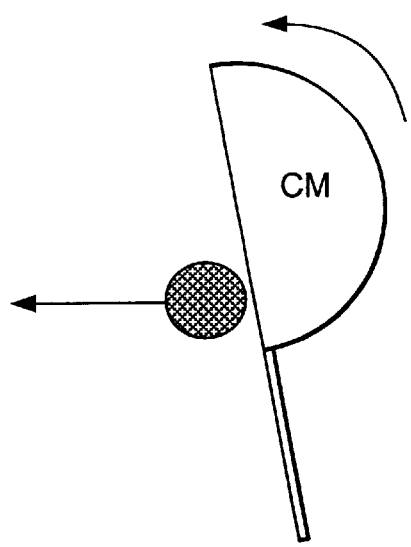
FIG. 9A  FIG. 9B
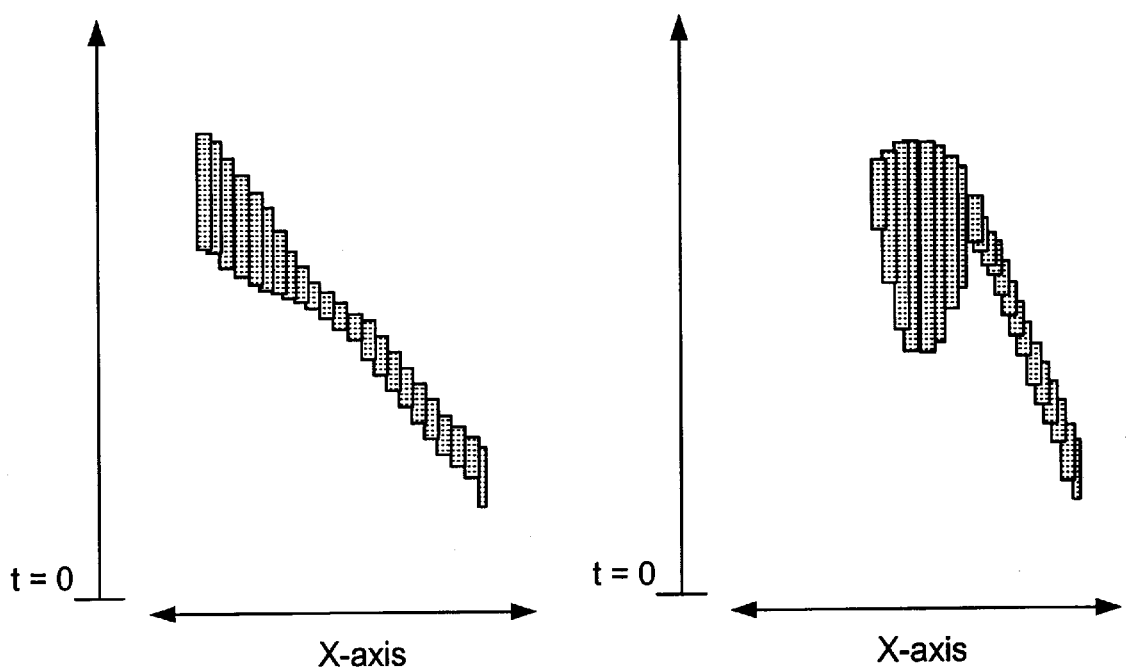
FIG. 10A  FIG. 10B

METHODS AND APPARATUS FOR A PORTABLE GOLF TRAINING SYSTEM WITH AN OPTICAL SENSOR NET

FIELD OF THE INVENTION

The present invention relates to golf training devices. More specifically, the invention is directed to portable golf training systems with optical sensor nets that capture and process dynamic spatial information for a golf ball and/or a golf club.

BACKGROUND OF THE INVENTION

There are a variety of apparatus and methods in the golf industry that provide limited information relating to golf ball trajectory and speed. Because a golf ball in flight generally adheres to the same basic principles of physics as other projectile objects, available systems today attempt to provide calculated information such as estimated carry and flight path based on numerous ball measurements obtained by a host of detectors and other related equipment.

Many systems have been proposed in the past to measure spatial positioning and information for a golf ball, a tennis ball or any other spherical projectile. These systems generally include numerous detectors and switches located along an expected flight path for the object. The spherical object may thus impinge upon particular detectors to thereby actuate corresponding electrical switches. Many transmission type or reflection type photoelectric switches may be also placed along an expected flight path, and may be actuated when a ray input for particular switches are blocked off by the object. Scanning laser beams have been also proposed that are paralleled across an expected flight path of a spherical object by using a concave mirror and lens system. The spherical object may pass through a scanning plane to thereby measure beam cut-off timing to determine launch positioning and angles for the spherical object in flight. At the same time, visual systems have also been provided that provide video camera images of the projectiles to provide relevant spatial information.

There are many disadvantages to these present day training systems which have been adapted for golf ball and club swing analysis. For example, some systems affect the intended path of the projectile or fail to obtain careful measurements which provides inaccurate flight information. Most apparatus also require a large number of switches, sensors or detectors to cover a relatively wide flight path area for the spherical projectile. In order to overcome some of the foregoing disadvantages or problems of the conventional measuring methods, systems has been proposed for determining the position of a flying spherical object with a parallel light band generated and projected onto a screen to form a linear image region. When a spherical object in flight crosses the parallel light band, it creates a silhouette on the screen within the image region. The position of this silhouette is detected by using sensors to thereby determine an instantaneous spatial position of the flying spherical object. The disadvantages for this system have been further overcome with measuring apparatus that purportedly determines instantaneous positioning of the object in flight without coming into contact therewith. The flight information may include speed, position and launch angle. Despite the foregoing efforts, golf training systems today still require excessive instrumentation and equipment.

SUMMARY OF THE INVENTION

The invention described herein provides methods and apparatus for golf training systems with optical sensor nets. In accordance with the principles of the invention, dynamic spatial information may be provided based upon either or both a golf ball and club information. A compact, single planar optical net is thus capable of capturing this information relating to a golf ball and/or a golf swing. Relevant ball information may be measured and derived with the systems described herein that includes ball speed, ball take-off and azimuth angles, which may in turn provide relevant calculated ball information such as ball spin, carry distance, trajectory, flight time and height. Golf club information may be also measured and derived to provide club swing path, head speed (before and after impact) head twist and club face angle throughout the swing.

Various aspects of the invention provide ball flight and club swing information with an optical sensor net formed with non-parallel rays of light. Ball speed and club speed information maybe detected with non-parallel rays of light. Another aspect of the invention provides ball speed and direction with either parallel or non-parallel rays of light. In yet another variation of the invention, club path information may be provided based on either parallel or non-parallel rays of light. It shall be understood that particular features of the described embodiments in the following specification may be considered individually or in combination with other variations and aspects of the invention.

Other objects and advantages of the invention will become apparent upon further consideration of the specification and drawings. While the following description may contain many specific details describing particular embodiments of the invention, this should not be construed as limitations to the scope of the invention, but rather as an exemplification of preferable embodiments. For each aspect of the invention, many variations are possible as suggested herein that are known to those of ordinary skill in the art.

BRIEF DESCRIPTION OF THE DRAWINGS

FIGS. 9A–B are simplified illustrations describing the off-centered contact and effect on a golf ball in relation to the club head.

FIGS. 10A–B are enlarged visual output illustrations that provide captured golf club information after contact with a golf ball.

DETAILED DESCRIPTION OF THE INVENTION

Figure 1:
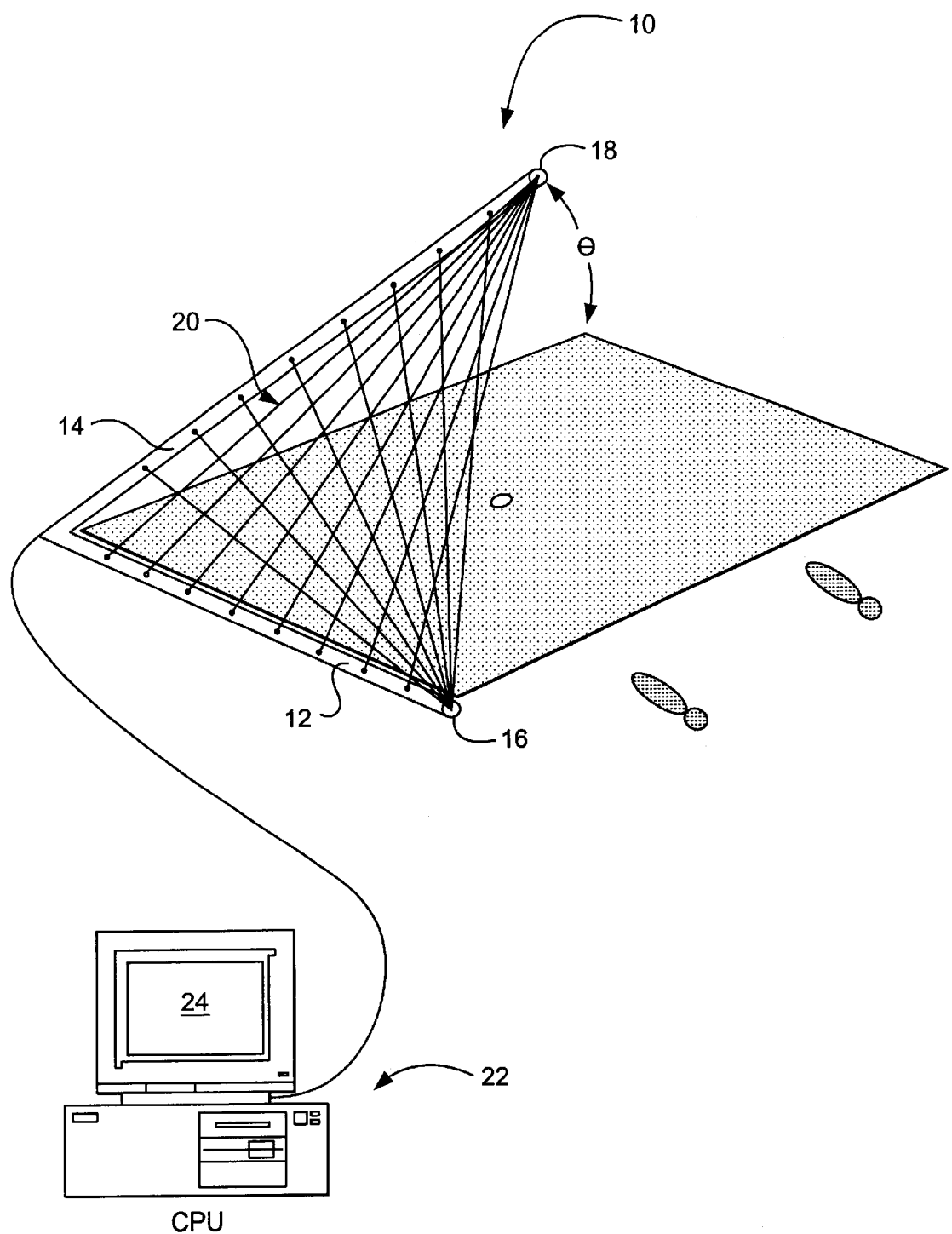
FIG. 1 is golf training optical sensor net system provided in accordance with the invention.

FIG. 1 illustrates a golf training system 10 with an optical sensor net 20 provided in accordance with the invention. An important advantage provided by the invention is that the ball may be placed at various locations with respect to optical sensor nets within the training systems described herein. The ball is not necessarily positioned at a fixed spot as with most earlier apparatus. An individual may thus strike golf balls freely without multiple sensors and fixed tee positions which may be selected nonetheless in order to provide even more ball and club information.

As shown in FIG. 1, the training system 10 may include a substantially L-shaped frame having a first leg 12 and a second leg 14 or extension. The first leg 12 may be positioned in a relatively horizontal position, and the second leg 14 may be placed in a substantially vertical tilted position. Either or both legs may be formed with a bent configuration to form a curved shape. The system may further include a light emitter assembly with a first light emitter 16 connected to the first leg 12 of the frame, and a second light emitter 18 connected to the second leg 14 of the frame. Each light emitter 16 and 18 may emit a spread of non-parallel light rays in a substantially single plane. The first and second light emitters 16 and 18 may also emit pulsed laser beams, and may be filtered to differentiate the rays of light produced by ambient illumination from those produced by the golf ball crossing the optical sensor net 20. Also, the light emitter assembly may include at least one optical beam splitter to split a single beam of light from the light emitter equally to its respective light detectors. The light emitter assembly may thus provide a focused laser beam and a beam splitter that generates diverging rays of light that are received by light detectors within the system. A variety of anti-reflective coatings may be selected as is known in the art to promote permeation of light rays through the beam splitter and other components of the light emitter assembly.

The optical sensor nets provided herein are capable of measuring and processing relational dynamic information for both a golf ball and a golf club. An array of light detectors with a first set of spaced apart light detectors may be positioned along the first leg of the frame to receive the non-parallel light rays emitted from the second light emitter. A second set of spaced apart light detectors may be positioned along the second leg of the frame that receive the non-parallel light rays emitted from the first light emitter. The array of light detectors on the first leg and the second leg of the frame may be spatially aligned and arranged at a predetermined space interval that is less than the radius of the golf ball. As a result, the non-parallel rays from both the first and the second light emitter provide an asymmetrical optical sensor net that captures relational kinetic information for a spheroidal object such as a golf ball and a golf club during a swinging motion when passed through at least a portion of the sensor net. Moreover, the asymmetrical optical sensor net may provide a two-dimensional and single planar optical net having relatively uniform density. The size of the sensor net may be varied according to desired operating parameters, and may preferably have dimensions ranging from 2 to 4 feet. Various combinations of additional light emitters and detectors may be selected.

A data processor 22 may be also provided with the optical sensor net that is in communication with the light emitter assembly, the array of detectors or any combination of selected components within the golf training system. The data processor or computer 22 may connected to timers and related instrumentation to measure periods of disruption for selected light detectors by the golf ball and by the golf club. Moreover, the data processor may process relational kinetic information for the golf ball and the golf club based on the disruption of selected light detectors and their respective time periods of disruption. A visual display 24 may be further provided to display data generated from the movement of the golf ball and/or golf club.

As shown in FIG. 1, the golf training device may include an optical grid 20 positioned at an angle. A generally L-shaped frame for the system may be positioned with respect to the ground at a preselected or variable angle ($\Theta$). A relatively horizontal leg portion 12 of the frame may rest on the ground in proximity to the ball hitting area, and a relatively vertical leg portion 14 of the frame angle may extend upwardly in a general direction towards the player. The frame angle $\Theta$ may range from 0 to 90 degrees, and preferably between about 30 to 60 degrees. The vertical leg portion 14 may also include a stand or support to assist in maintaining the frame in a relatively fixed position. The open-construction of an L-shaped frame described herein enables a player to swing through the optical sensor net with minimal risk of striking portions of the training system. Other frame configurations may be selected having additional leg sections that permit free passage of a golf ball and/or club through the optical sensor nets 20 described herein. The angled configuration of the system 10 also captures relatively more golf club information during the swing, particularly when positioned relatively close to the individual player thus providing a compact golf training system. The tilted frame positioned at preferable angles tends to capture higher angles of changing golf shots with different trajectories. Moreover, the angled positioning of the frame and sensor net may provide improved resolution of golf club swing information. Dynamic spatial information for a golf ball may be similarly captured and processed simultaneously. After the golf ball passes through the optical sensor net 20, it may be retrieved or caught in a ball net positioned along the flight path of the ball to allow an individual to hit multiple balls in order to gather more golf ball and club information.

Another variation of the invention provides an optical sensor system for measuring dynamic spatial information of a substantially spheroidal projectile. The sensor system may include a support frame having at least two extensions with at least one light source or laser that emits non-parallel rays of light. Each light source may be positioned at a location along the frame in a predetermined plane or pattern. A plurality of light detectors may be aligned and arranged at predetermined spatial intervals along the support frame. The light detectors may be also positioned and spaced apart for detecting the non-parallel rays of light emitted from a light source. A first light source may emit a first set of non-parallel rays of light to a first set of light detectors, and a second light emitter may emit a second set of non-parallel rays of light to a second set of light detectors. The light source may be a semiconductor diode laser with a cylindrical lens positioned along an optical axis that provides divergent rays of light to form a substantially fan-shaped pattern or configuration. For example, the light source may be arranged to emit a laser beam of 3–20 mW in consumptive power and 630–790 nm in wave length. A variety of other light sources with different power and frequency output may be selected to form an array of non-parallel rays of light. Selected lenses, filters and beam splitters may be also selected to provide dispersion of the light rays from a single light source. Additionally, a variety of light detectors or photosensors may be selected in accordance with the invention including PIN, MSN and diodes which are available from vendors like Hewlett-Packard, Temic, Siemens and Hamamatsu.

The first and the second set of light detectors within the training system may detect intersecting non-parallel rays of light to provide an asymmetrical two-dimensional or single planar optical sensor net. The sensor net may be formed at a variety of angles with respect to the ground, preferably angled more towards an individual player to capture more swing information and to provide a compact system. The various interruptions of the rays of light within the sensor net may be thus detected and measured when the spheroidal projectile, club shaft, and club head pass through the rays of light. A data processor and instrumentation may be also selected for communication with the plurality of light detectors to measure a plurality of interruption times in which the rays of light to selected light detectors are interrupted or blocked off by the spheroidal projectile. Moreover, the data processor or microprocessor may process and provide dynamic spatial information for the spheroidal projectile based on the location and the interruption time for each selected light detector. Given the diameter length of the spheroidal object, each light detector may be spaced apart a defined distance that is less than the diameter length of the spheroidal object so that at least two rays of light are interrupted. A variety of predetermined information for the projectile or golf ball may be further stored in a memory coupled to the microprocessor. The combination of stored information and measured readings from the optical sensor net within the training system provide dynamic spatial information for the spheroidal projectile such as its speed and direction. This information may be in fact derived without a predetermined initial position or velocity for the projectile. A distinct advantage provided in accordance with the invention is the calculation of dynamic ball information without necessarily fixing the distance between a golf ball and the sensor net. Additional sensors and switches may be included in the training system nonetheless to determine an initial launch event or location, but is not required. Moreover, the dynamic spatial information may include certain correction factors that account for variable playing conditions such as wind speed and direction, humidity, temperature, pressure. These environmental conditions may reflect existing hitting conditions or various simulations that may be stored in the system memory, and executed upon command as desired by the individual.

Figure 2:
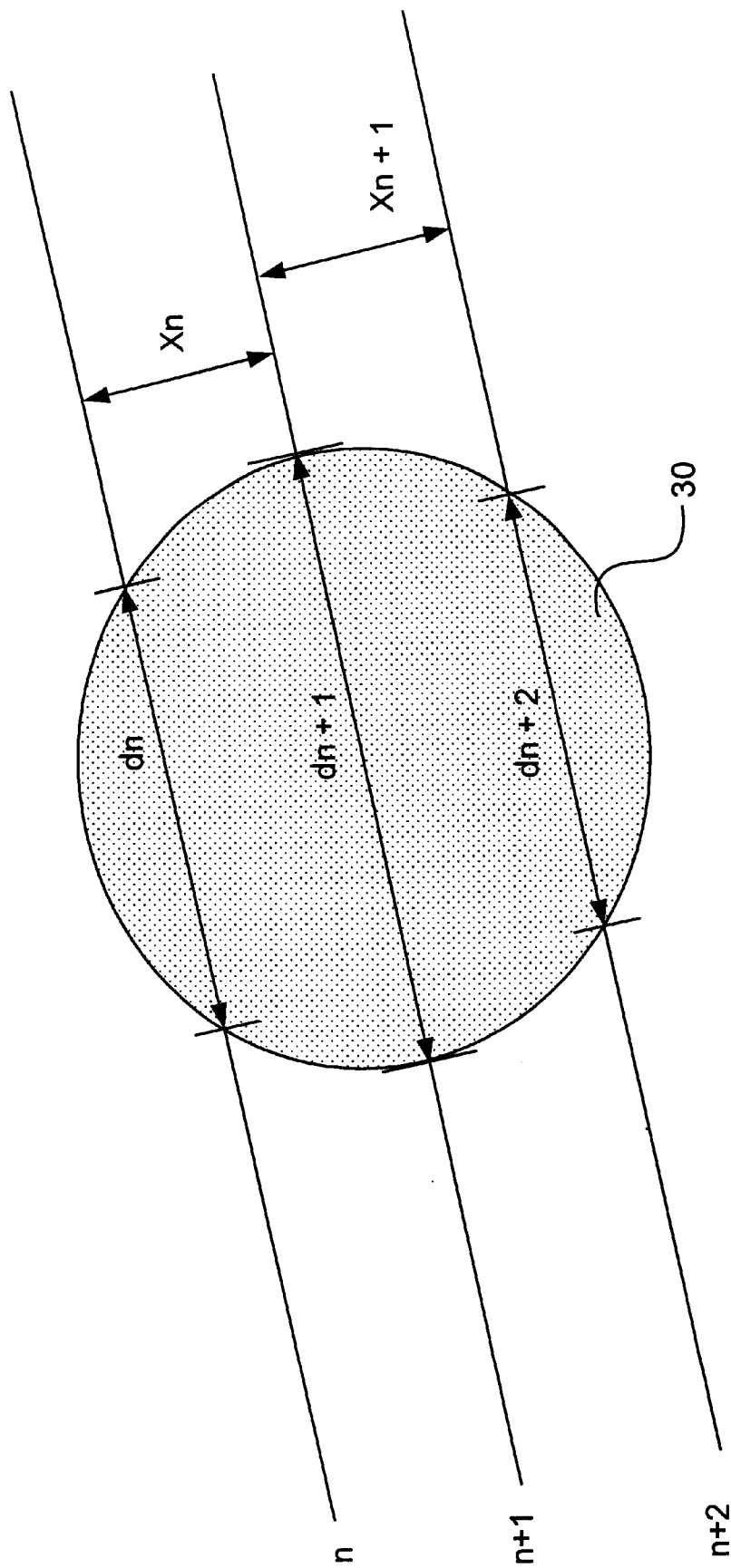
FIG. 2 is a diagram illustrating the calculation of ball speed based on the disruption of a sensor net with non-parallel rays of light.

As shown in FIG. 2, the calculation of ball speed and direction may be based on the measured disruption of light rays within an optical sensor net formed with non-parallel rays of light. Three or more rays of light may be disrupted within the sensor net. A plurality of individual detectors (n, n+1, n+2 ...) may detect their respective rays of light which may be spaced apart a predefined distance. For example, when multiple laser beams are cross-sectionally blocked off by a flying golf ball 30, the measured blocking time ($t_n, t_{n+1}, t_{n+2} \ldots t_{n+i}$) may correspond or translate into the physical length of cross-sectional portions of the ball ($d_n, d_{n+1}, d_{n+2} \ldots d_{n+i}$). $t_n$ may be defined as the time interval that blocks off a ray of light for the nth detector, and the time base may be measured and provided by the instrumentation within the training system. $d_n$ may be defined as the length of the distance for the ball that blocks off light being directed to the $n^{th}$ detector. Because the golf ball diameter and curvature may be predetermined as a known variable, and the beam interruption times may be measured, the entire image of the ball may reconstructed along with its discrete cross-sectional paths. Once the image of the golf ball is fitted or matched against the cross-sectional paths, the location of the center of mass may be obtained. Accordingly, the ball speed, direction and trajectory may be based upon measurable ball path information that is derived from the laser beam blocking paths.

In accordance with this aspect of the invention, an optical sensor system may thus provide instantaneous dynamic information for a spherical projectile such as a golf ball. The sensor system may include a structural support frame with at least one light emitter assembly that emits non-parallel rays of light to form an optical sensor net. The support frame can be formed with two extensions that generally provide an L-shaped design. A first light emitter assembly may be positioned on the first extension, and a second light emitter assembly may be positioned on the second extension. The light emitter assemblies may each include a light source and an optical element or lens that provides non-parallel rays of light. The light emitter may be a focused laser light source, or non-coherent LED or white light, and the optical element may be a beam splitter or cylindrical lens. Each laser light source may provide a focused laser beam through an optical beam splitter to split rays of light equally to a plurality of selected light detectors. The light detectors may be spatially arranged to form an asymmetrical optical sensor net for detecting the multiple rays of light emitted from the light emitter. Furthermore, the light detectors may be positioned along the support frame and spaced apart at selected or predetermined spatial intervals for detecting the non-parallel rays of light emitted from the first and the second light emitter assemblies. These spatial intervals may be varied, and may be equal to or less than a predetermined radius for a golf ball. As a result, the flying spherical object blocks off at least three rays of light to provide dynamic spatial information in accordance with the invention. The light detectors may be further arranged relatively vertically or horizontally in-line with the light emitter assembly to detect emitted light and the interruption times for respective rays of light when the spherical projectile passes through the optical sensor net. In addition, the sensor system may include instrumentation and a data processor in communication with the light detectors for measuring and processing a plurality of interruption times in which the rays of light to selected light detectors are interrupted or blocked off by the spherical object. The blockage time of the rays of light may be measured and inputted into a computer with arithmetic operators that detect a single or a plurality of photodiodes for which the rays of light are blocked off. A system microprocessor may be also selected for processing and calculating substantially instantaneous dynamic information for the spherical projectile based on available information including the location and the interruption time for each selected light detector. Additionally, a visual display may be selected to display data generated from the movement of the golf ball.

Figure 3:
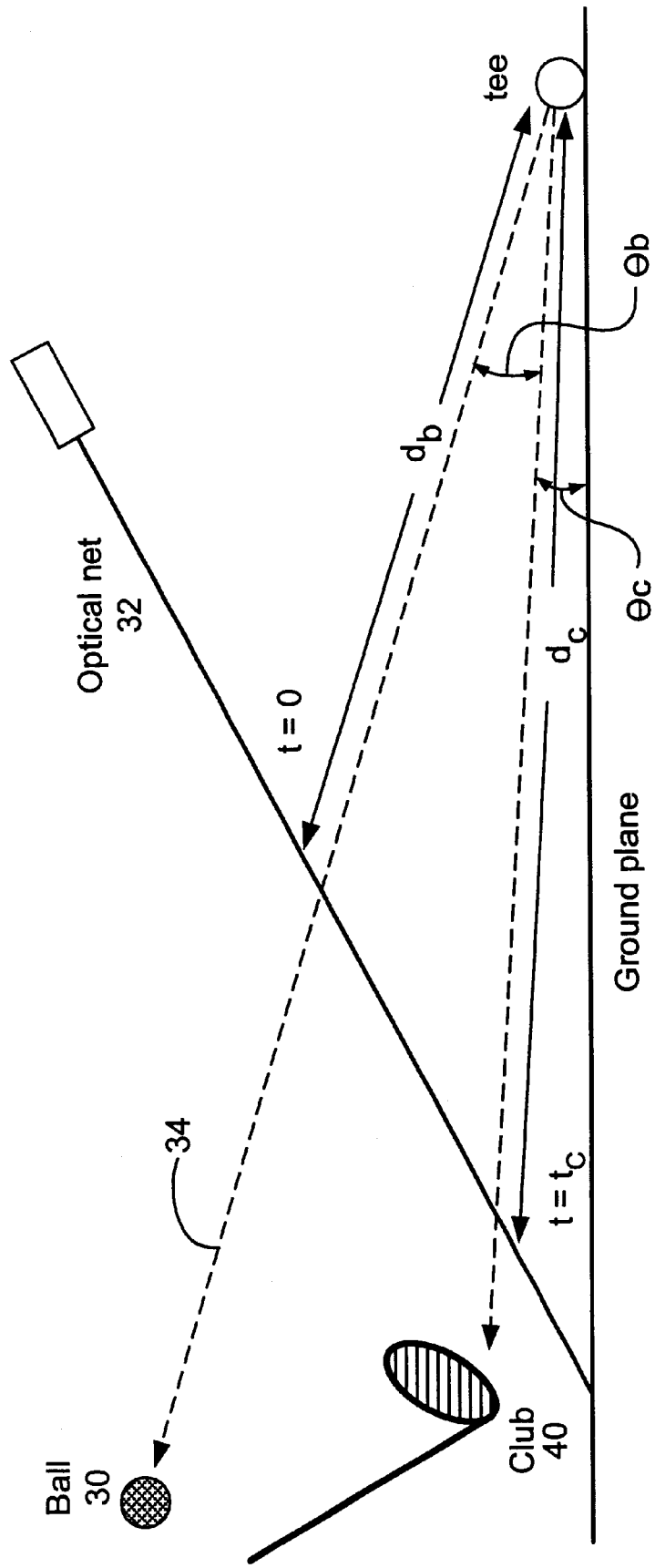
FIG. 3 is a simplified drawing demonstrating the calculation of relative golf ball and club speed in accordance with another aspect of the invention.

Another aspect of the invention provides dynamic spatial information for both a golf ball and a club. As shown in FIG. 3, the variation of the invention may include optical sensor nets similarly described herein with either non-parallel or parallel rays of light. As with other embodiments of the invention described herein, ball and club speed may be calculated without tee sensors or hitting the ball from a fixed location. An optical sensor net 32 may be positioned in the line of the intended ball path 34 to capture information relating to the ball 30 and the golf club 40 based upon the disruption times for selected rays of light. An L-shaped frame may be selected for these training systems to allow an individual to hit the ball 30 and swing through the sensor net 32. When the golf ball 30 passes through the optical net 32, the initial time may be established t=0. The time for detecting the ensuing golf club by the optical net 32 following the golf ball 30 may be defined as $t=t_c$. At this time, it may be assumed the ball 30 was hit at t=x which is unknown at this point. The club speed after impact may be expressed as:

$$V_{ca} = \frac{d_c}{t_c - X}$$

Ball speed may be defined as:

$$V_b = \frac{d_b}{-X}$$

g may be also determined by experimental data, and may represent the potential energy of the shaft during impact of the club to the ball. Accordingly, when the principle of the conservation of energy is applied then:

$$\frac{1}{2}M_c V_{cb}^2 = \frac{1}{2}M_b V_b^2 + \frac{1}{2}M_c V_{ca}^2 + g\left(\frac{1}{2}M_c V_{ca}^2\right)$$

wherein $M_c$ is the mass of the club, $V_{cb}$ is the velocity of the club before impact, $M_b$ is the mass of the ball, $V_b$ is the velocity of the ball after impact, and $V_{ca}$ is the velocity of the club after impact. f may represent the speed ratio which is related to the club and ball momentum transfer due to impact, and may be a function of the ball speed that is determined by experimental data.

$$V_{cb} = \sqrt{V_{ca}^2 + a\frac{V_{cb}^2}{f^2} + gV_{ca}^2}$$

wherein a is the mass ratio between the club and the ball, a equals approximately $M_b/M_c$ $$V_{cb}^2 = V_{ca}^2(1+g) + \frac{a}{f^2}V_{cb}^2$$

$$V_{cb} = \sqrt{\frac{1+g}{1-\frac{a}{f^2}}} V_{ca}$$

$$A = \sqrt{\frac{1+g}{1-\frac{a}{f^2}}} V_{ca}$$

$$X(t_c) = fd_b \frac{t_c}{fd_b - d_c}$$

wherein $t_c$ is the measured time data between the ball and the club passing through the optical sensor net, $d_c = d/\cos \Theta c$, and $d_b = d/\cos \Theta b$. As a result, the following may be obtained:

$$V_b(t_c) = \frac{d_b}{-X(t_c)}$$

$$V_{cb}(t_c) = V_b(t_c) \cdot f$$

$$V_{ca}(t_c) = \frac{V_{cb}(t_c)}{A}$$

Based upon experimentation and field analysis, f has been determined by the following expression:

$$f(V_b) = (0.07 + 0.04 V_b)$$

wherein $V_b$ may be measured in mph or miles per hour, and g has been determined to be between 0.01 and 0.1 depending upon the shaft selected. Accordingly, with the above calculations, the ball speed ($V_b$) and the club speed ($V_{ca}$) may be calculated without having a sensor positioned at a tee position. It has been observed that the accuracy in determining speed is better than 0.1% if a spacing of about 10 inches is used between the net and the tee positions. In the tilted frame configuration, this calculation may be readily determined since $d_b$ and $d_c$ may be readily determined from the frame position regardless if it is relatively perpendicular to the ground at 90 degrees or tilted.

The invention also includes a method for providing dynamic spatial information based upon the relations described above for moving objects with an optical sensor net. The method may include the initial selection of a sensor system with a divergent light source for emitting at least two non-parallel rays of light towards an array of light detectors to form an optical sensor net. At least one moving object such as ball and/or golf club may pass through the non-parallel rays of light within the optical sensor net to interrupt emission of the rays of light to the array of light detectors. Selected light detectors may be identified that receive interrupted rays of light emitted by the divergent light source caused by the moving object passing through the optical sensor net. The interruption times for the selected detectors within the array of light detectors may be measured, and the dynamic spatial information may be thus provided for the moving object based on the measured interruption time for the selected light detectors that receive interrupted non-parallel rays of light. The moving object may be a golf ball with a preselected diameter, a golf club or both.

Figure 4A:
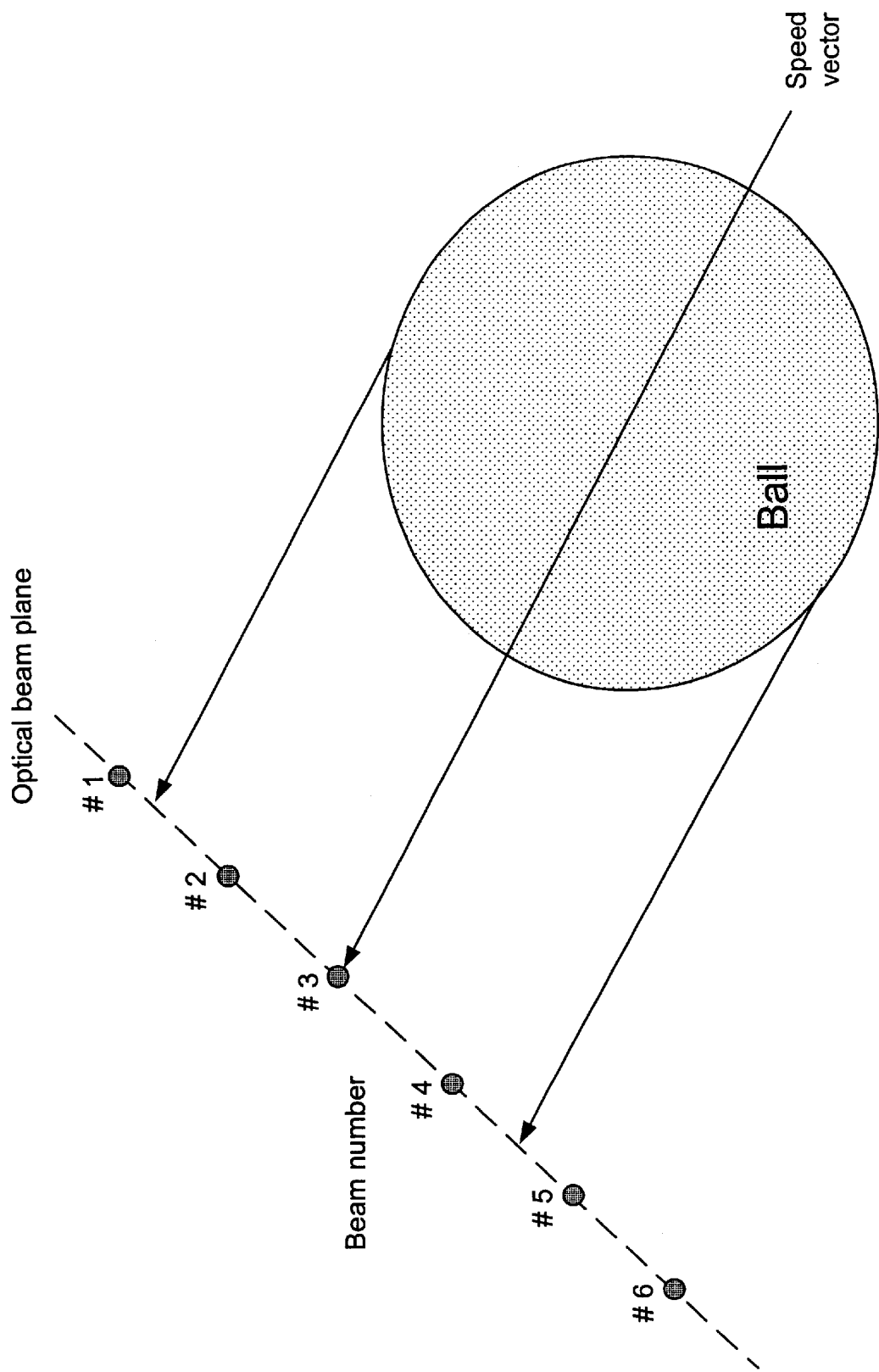
FIGS. 4A–B are diagrammatic explanations that describe yet another aspect of the invention that provides directional information for a golf ball path.
Figure 4B:
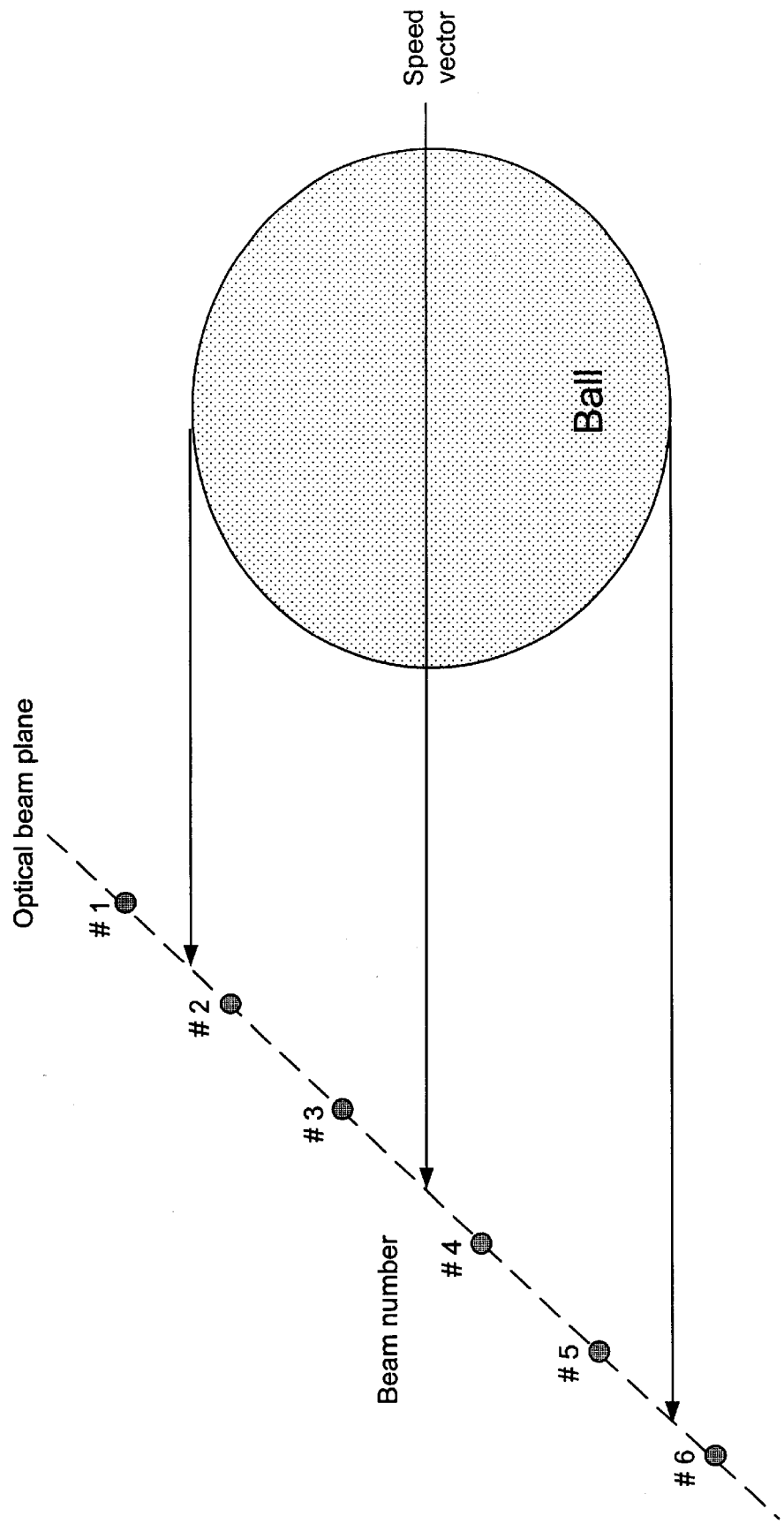

Another variation for this aspect of the invention may include parallel or non-parallel laser beams to improve the accuracy of determining the ball and club positions by applying the concept of a weighting correction. When the frame is tilted, at different ball takeoff and azimuth angles, the number of beams that will be blocked off by the ball and the club will be different. It is thus possible to use the total number of beams blocked off by the ball at different angles to improve the accuracy of determining the ball and club positions as shown in FIGS. 4A–B. Depending on the relative angle of the optical sensor net, and flight path of the ball and the swing path of the golf club, the number of optical beams that are blocked will be different. In one instance, as shown in FIG. 4A, only beams #2, 3 and 4 are blocked by a passing ball. Meanwhile, in FIG. 4B, beams #2, 3, 4 and 5 are blocked when the ball and/or optical net are positioned at relatively different angles. The number of beams blocked, for how long, and in which sequence, all provide information in accordance with this aspect of the invention to provide ball information such as speed and direction.

Figure 5:
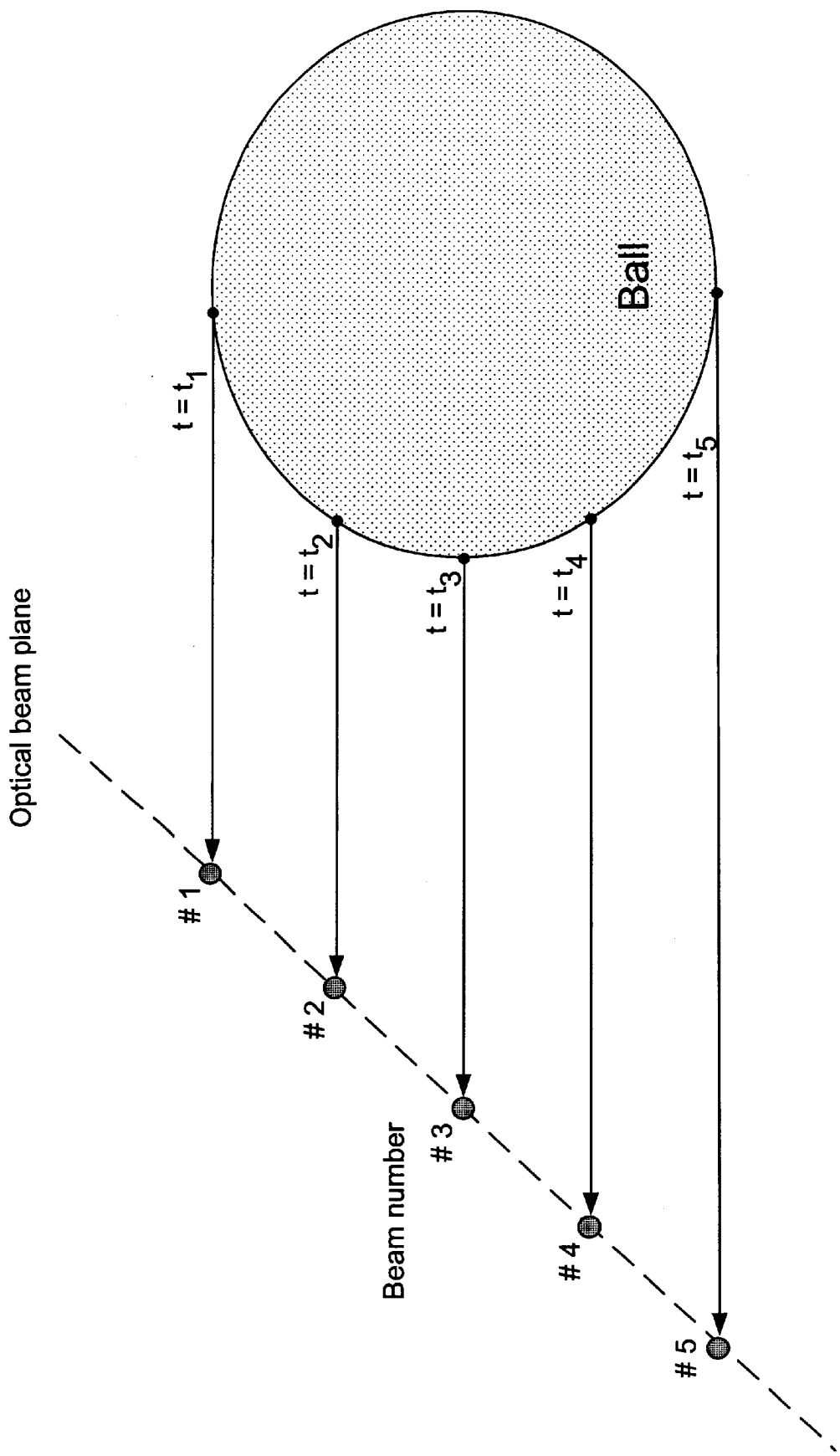
FIG. 5 is a diagrammatic explanation for determining the path of a spherical projectile such as a golf ball based upon the disruption of selected optical beams.

With respect to yet another aspect of the invention, as shown in FIG. 5, the ball speed and its relative direction may be detected with parallel or non-parallel beam of light without knowing the initial starting or tee position of the ball. An outer frontal surface of the golf ball intercepts an optical beam plane upon contact. The golf ball intercepts optical beam #1, 2, 3, 4 and 5 at $t=t_1, t_2, t_3, t_4,$ and $t_5$, respectively. By examining the time ratio of $t_1, t_2, t_3, t_4$ and $t_5$ (since the curvature of the golf ball may be considered a given parameter), the ball speed and direction may be determined without knowing its original position by:

Step 1→determining how many beams are blocked
Step 2→determining which beam is blocked first
Step 3→determining the time ratio between each beam in reference to the first beam
Step 4→since there is only one direction of the traveling ball that will match the time ratio given by the data, the direction of the ball may be determined with appropriate time resolution between the blocking times for each beam $t_1 \ldots t_5$
Step 5→once the direction or the relative angle with reference to the optical beam plane is known, the ball speed may be also determined based on the interruption time by the ball with a known curvature.

The invention thus provides methods and apparatus for calculating ball traveling information without fixing the ball starting position or the time of impact when the club hits the ball. The time ratios between different blocked beams are measured to provide ball flight information. By applying the curvature of the ball, and by knowing the time when each beam is blocked, the ball location may be better estimated by using a simple averaging method.

$$\text{Ball Center Position} = \frac{\sum_{i=1}^{N}(i^{th} \text{ beam position}) \times (\Delta t_i)}{\sum_{i=1}^{N} \Delta t_i}$$

N may be defined as the number of beams blocked by the ball.

Figure 6:
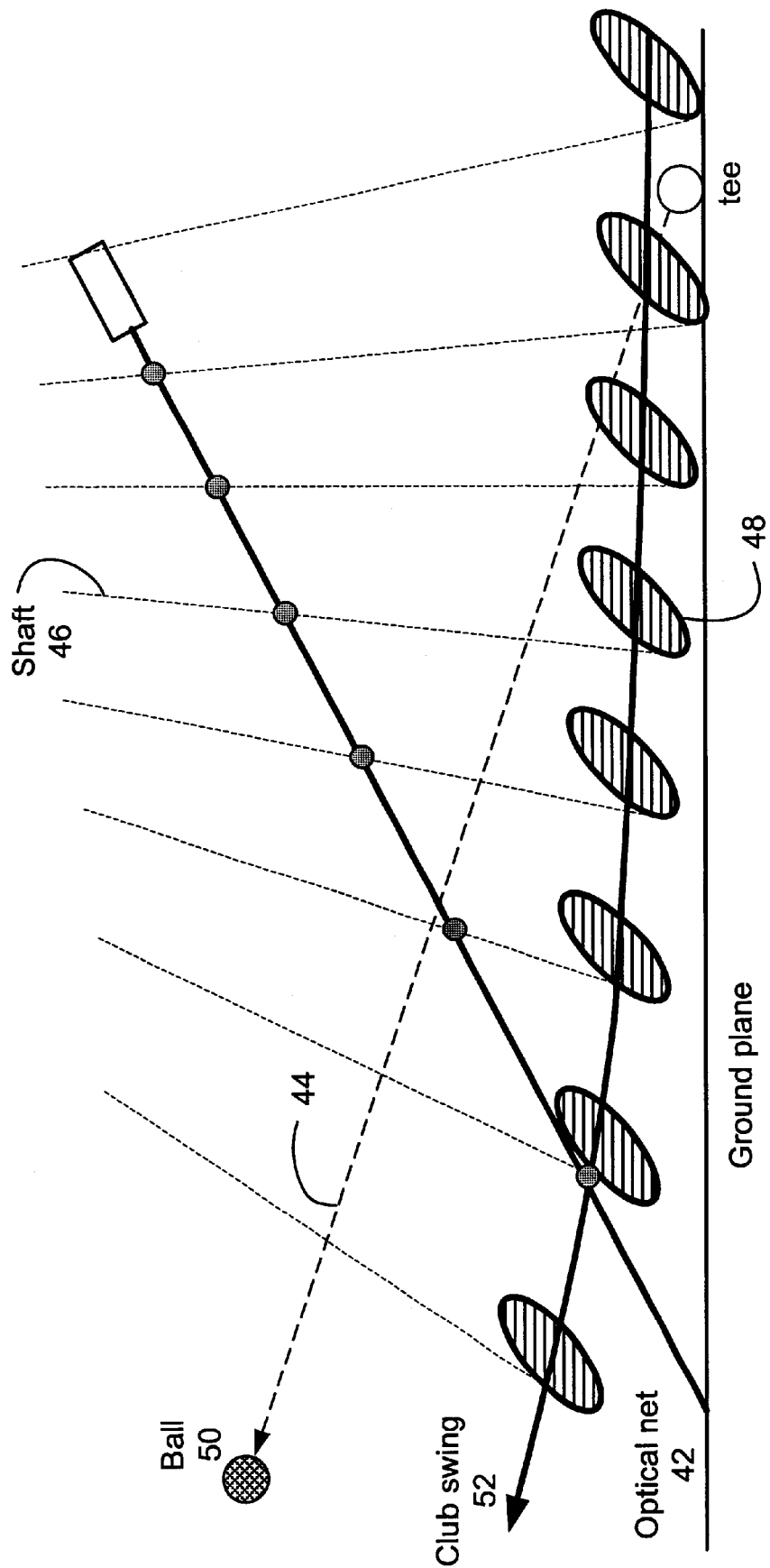
FIG. 6 is a simplified side view of another golf training system in accordance with the invention that provides both golf club and ball dynamic spatial information.

Another aspect of the invention provides dynamic spatial information for a golf club as it passes through optical sensor nets described herein. With respect to this variation of the training systems described herein, as illustrated in FIG. 6, portions of the club shaft 46 and the club head 48 are detected and monitored by the sensor net 42 as the club passes through. In addition to detecting ball flight path 44 and information as described herein, the training system may determine both the club swing path 52 and any twisting of the club head due to torque applied by hitting the golf ball off-center with respect to the center of gravity for the club head. Although a tilted L-shaped frame is shown in FIG. 6, it shall be understood that frames with other configurations may be selected that are not tilted. Similarly, the optical sensor net 42 may include both parallel and non-parallel rays of light with respect to this aspect of the invention. The swing path 52 and club head movement may be detected and tracked with the optical sensor net 42, and relevant time data may be collected or measured so that important golf swinging information may be observed and communicated to a player. When a player is preferably positioned relatively close to the net 42 so that club information may be determined, both ball and golf club information may be derived by identifying which light detectors are disrupted, and for how long. The initial disruption of the net 42 is typically caused by the golf ball 50 passing through, which may be followed by the club head 48. A method may be thus provided in accordance with the invention for obtaining dynamic spatial information which includes the step of passing a golf club through either parallel or non-parallel rays of light within the optical sensor net to interrupt emission of the rays of light to the array of light detectors. A group of selected light detectors may be identified that receive interrupted rays of light emitted by the divergent light source caused by the golf club passing through the optical sensor net. The interruption times for the rays of light to this group of selected detectors may be detected and measured within the system. As a result, dynamic spatial information may be computed for the golf club based on the measured interruption time for the selected light detectors that receive interrupted non-parallel rays of light. This includes club speed and swing path information. Similarly, another group of selected light detectors may detect and measure interruption times for a golf ball to provide relevant ball information such as speed and trajectory as it also passes through the net when the swing training system is configured to not only detect the golf club swing.

Figure 7:
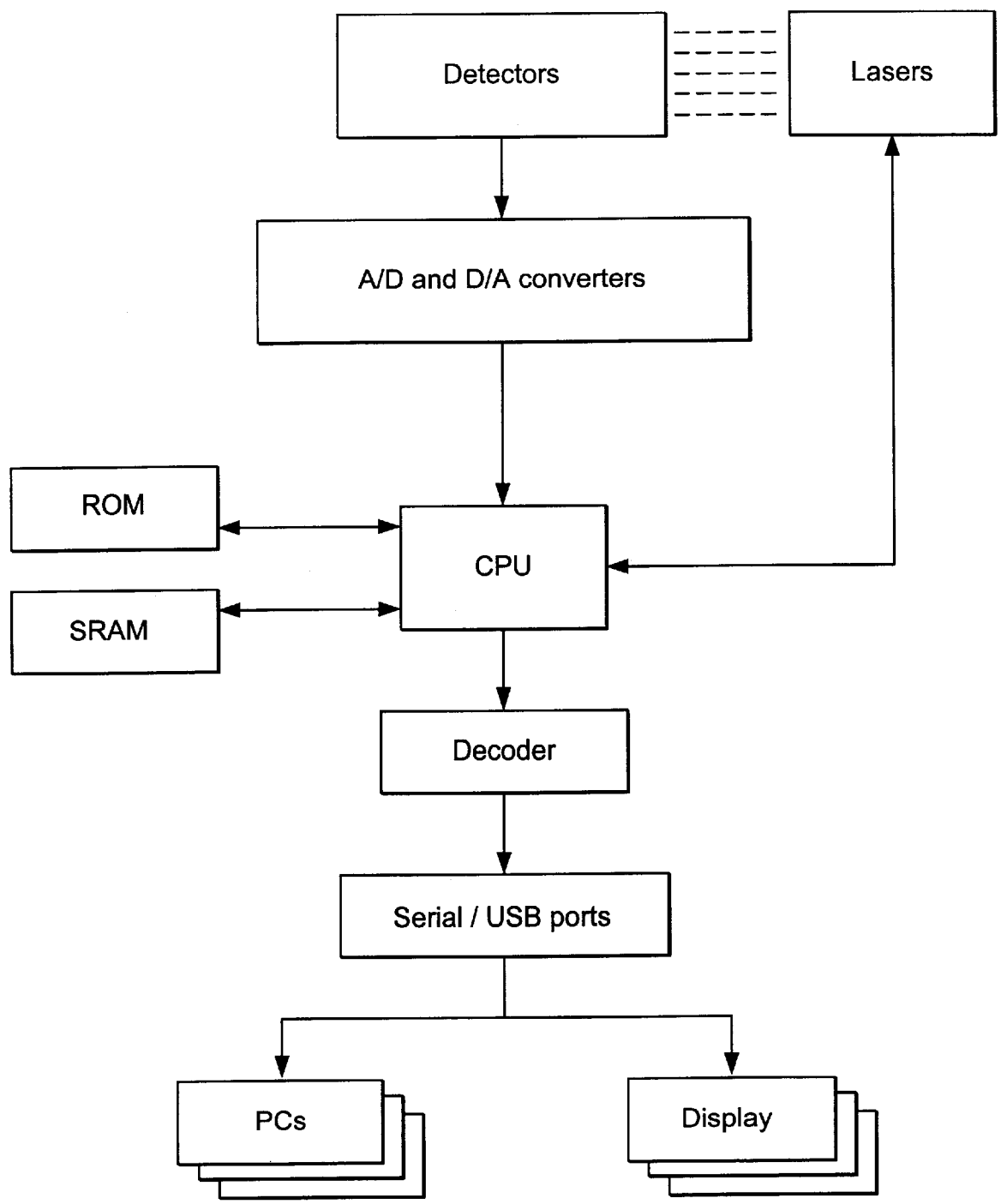
FIG. 7 is a simplified schematic diagram illustrating the apparatus and steps involved with processing and receiving information from the optical sensor nets described herein.

FIG. 7 is a simplified schematic diagram illustrating the apparatus and steps involved with processing and receiving information from the optical sensor nets described herein. A microprocessor control system may be provided that comprises a set of detectors and lasers mounted on a mechanical frame to form an optical detection net. The system may further include an analog to digital (A/D) converters or conditioning circuitry, a computer or central processing unit (CPU) that receives or takes the detector input to perform selected or necessary logic determination, a read-only memory (ROM) bank that may contain the algorithms for performing CPU computations, a random access memory (RAM) bank that stores computational data, a logic decoder, and sets of output ports such as serial bus or universal serial bus (USB) that communicates with displays and/or other personal computers.

When a golf player swings a club to make impact to a golf ball, the ball passes through the optical net first to trigger the electronic circuitry within the computerized training system to commence the collection of data relating to both the golf ball and the club. After the circuitry is initially triggered by the relatively fast moving golf ball, the microprocessor and RAM may begin to collect the data over a predetermined period of time until the following club passes through the optical net to acquire all needed data for computation. The ball and club swing path signals received from the laser light detectors may be first sorted by the analog to digital (A/D circuitry) for proper coordinate and time-duration information. The collected information may be subsequently analyzed by the microprocessor or CPU using the predetermined algorithm that may be stored in memory or the ROM bank. After microprocessor computation is performed, the computed data may be temporarily kept in the RAM for additional computation if needed or desired. The determined ball speed, ball take-off directions, ball traveling trajectory, club swing path, club face angle, and club head twisting information may be then directed through the decoder to communicate with different peripherals including displays and other computer systems for additional processing such as other golf training and gaming applications including home entertainment systems and video games. After the ball and club swing information is passed to the display or additional PCs, the electronic system may be reset to receive new data. An LED indicator on the optical frame may be lighted to indicate the readiness (READY) of the unit for next play or golf shot.

Figure 8:
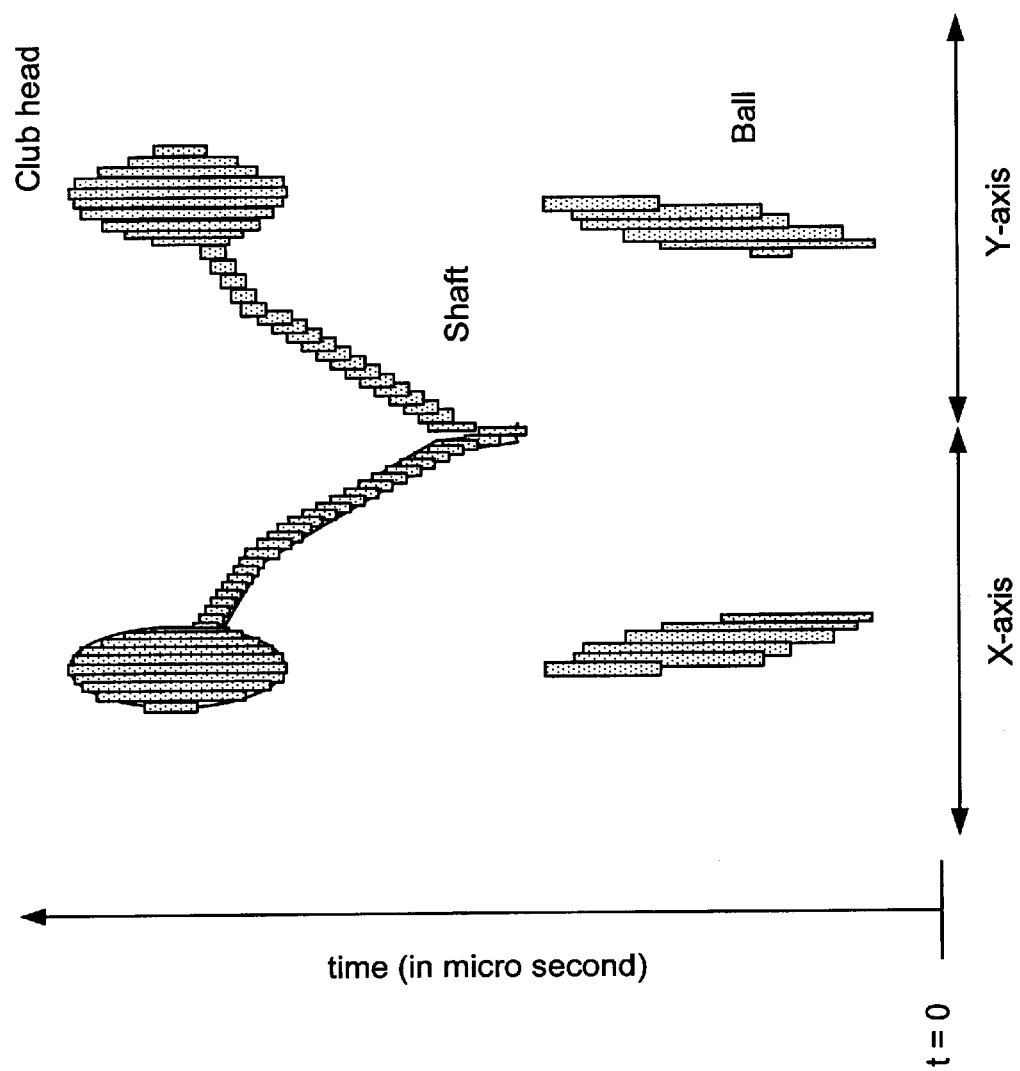
FIG. 8 is an example of visual output that may be provided by the apparatus described herein that includes relative golf club and ball information.

With the electronic detection circuitry and apparatus described herein, a printed visual output may be provided as shown in FIG. 8 that includes relative golf club and ball information. The output may include an image representing the path of the ball and a separate image representing the golf club. A horizontal axis of the output may be divided to illustrate images of the ball and club along both the X-axis and the Y-axis. The output may be derived from the disruption of rays of light within the net, and may be translated into images corresponding to selected detectors that are disrupted. At the same time, a vertical axis of the output may be a time scale starting from time=0 when a first group of disruption times for selected detectors in the net is observed which is typically caused by the ball, and a second group of disruption times for selected detectors in the net caused by the club. A variety of time scales may be also selected for these systems including a $10^{-6}$ second scale as shown to capture data from the optical sensor net. The general path of the ball may be tracked with the image provided in relation to a complementary image of the club shaft. The flex of the club shaft may be even observed with the displayed output. As with other embodiments of the invention described herein, a compact sensor net with a tilted design may provide more relevant golf club information since a relatively larger portion of the club shaft and head information may be captured by the closely positioned sensor net. The combined information and output may be thus used to calculate the ball flight and club swing to provide realistic or near realistic ball trajectory predictions.

A variety of algorithms may be developed for the golf training systems described herein to provide pattern recognition of club swing information that indicate club head twist direction after impact with a golf ball. For example, as shown in FIGS. 9A–B, an off-centered contact with the ball as with toe shots cause the club head to generally rotate in a clockwise rotation as illustrated. A toe shot generally occurs when contact with the ball is not made with its center of mass (CM), and away from the player. The club head and shaft image is captured by the optical sensor nets provided herein as a function of time as illustrated in FIGS. 10A–B. The club image for a toe shot may be captured along an X-axis and plotted against time as shown in FIG. 10A. Similarly, when a head shot occurs wherein the contact with the ball is not made with the center of mass for the club and is towards the player, the club head may generally rotate in a relatively counter-clockwise rotation. As illustrated in FIG. 10B, the club image for a head shot may be captured to reflect this type of contact with the golf ball. Based upon the club swing information provided with the optical sensor nets systems herein, corrective steps may be prescribed during training so desirable square contact between the golf ball and golf club can be achieved.

While the present invention has been described with reference to the aforementioned applications explained in detail above, these descriptions and illustrations of the preferred embodiments and methods are not meant to be construed in a limiting sense. It shall be understood that all aspects of the present invention are not limited to the specific depictions, configurations or relative proportions set forth herein which depend upon a variety of conditions and variables. Various modifications in form and detail of the various embodiments of the disclosed invention, as well as other variations of the present invention, will be apparent to a person skilled in the art upon reference to the present disclosure. It is therefore contemplated that the appended claims shall cover any such modifications, variations or equivalents of the described embodiments as falling within the true spirit and scope of the present invention.

What is claimed is:

1. A golf training system with an optical sensor net for measuring the relational dynamic information of a golf ball and a golf club comprising:
   a substantially L-shaped frame having a first leg and a second leg;
   a light emitter assembly including a first light emitter connected to the first leg of the frame and a second light emitter connected to the second leg of the frame, wherein each light emitter emits a spread of non-parallel light rays in a substantially singular plane;
   an array of light detectors including a first set of spaced apart light detectors positioned along the first leg of the frame that receive the non-parallel light rays emitted from the second light emitter, and a second set of spaced apart light detectors positioned along the second leg of the frame that receive the non-parallel light rays emitted from the first light emitter, wherein the non-parallel rays from the first and the second light emitter form an asymmetrical optical sensor net that captures relational kinetic information of a golfball and a golf club during a swinging motion when passed through at least a portion of the sensor net; and
   a data processor in communication with the array of detectors that measure periods of disruption for selected light detectors by the golf ball and by the golf club, and for processing relational kinetic information for the golf ball and the golf club based on the disruption of selected light detectors and their respective periods of disruption.

2. The golf training system as recited in claim 1 wherein the first leg is positioned substantially horizontal and the second leg is positioned substantially vertical.

3. The golf training system as recited in claim 1 wherein the array of light detectors on the first leg and the second leg of the frame are spatially aligned and arranged at a predetermined space interval that is less than the radius of the golf ball.

4. The golf training system as recited in claim 1 wherein the dimension of a length of the optical sensor net is between 2 to 4 feet.

5. The golf training system as recited in claim 1 wherein the data processor is in communication with the light emitter assembly.

6. The golf training system as recited in claim 1 further comprising a visual display to display data generated from the movement of the golf ball.

7. The golf training system as recited in claim 1 further comprising a catching net placed along an intended path of the golf ball.

8. A method for providing dynamic spatial information for a golf club with an optical sensor net comprising the steps of:
   selecting a sensor system including a divergent light source for emitting at least two non-parallel rays of light towards an array of light detectors to form an optical sensor net;
   passing the golf club through the non-parallel rays of light within the optical sensor net to interrupt emission of the rays of light to the array of light detectors;
   identifying selected light detectors that receive interrupted rays of light emitted by the divergent light source caused by the golf club passing through the optical sensor net;
   detecting interruption times for the selected detectors within the array of light detectors that detects interrupted rays of light; and
   measuring dynamic spatial information for the golf club based on the measured interruption time for the selected light detectors that receive interrupted non-parallel rays of light.

9. A method for providing dynamic spatial information with an optical sensor net for a golf club and a golf ball comprising the steps of:
   selecting a sensor system including a divergent light source for emitting at least two non-parallel rays of light towards an array of light detectors to form an optical sensor net;

passing the golf ball through the non-parallel rays of light within the optical sensor net to interrupt emission of the rays of light to the array of light detectors;

identifying selected light detectors that receive interrupted rays of light emitted by the divergent light source caused by the golf ball passing through the optical sensor net;

detecting interruption times for the selected detectors within the array of light detectors that detects interrupted rays of light;

measuring dynamic spatial information for the golf ball based on the measured interruption time for the selected light detectors that receive interrupted non-parallel rays of light;

passing a golf club through the optical sensor net through the non-parallel rays of light within the optical sensor net to interrupt emission of the rays of light to the array of light detectors;

identifying a second group of selected light detectors that receive interrupted rays of light emitted by the divergent light source caused by the golf club passing through the optical sensor net;

detecting interruption times for the second group of selected detectors within the array of light detectors that detects interrupted rays of light; and computing dynamic spatial information for the golf club based on the measured interruption time for the selected light detectors that receive interrupted non-parallel rays of light.

10. The method for providing dynamic spatial information as recited in claim 9 wherein the dynamic spatial information includes golf ball speed and trajectory.

11. The method for providing dynamic spatial information as recited in claim 9 wherein the dynamic spatial information includes club speed and swing path.

* * * * *